US012759237B2

(12) United States Patent
Gay et al.

(10) Patent No.: US 12,759,237 B2
(45) Date of Patent: Oct. 13, 2026

(54) PRINTER FOR PRINTING A 3D OBJECT BASED ON A COMPUTER MODEL

(71) Applicant: CREATE IT REAL A/S, Aalborg (DK)

(72) Inventors: Jeremie Pierre Gay, Aalborg (DK); Zoltan Tamas Vajda, Aalborg (DK); Folmer Gringer Brem, Aalborg (DK)

(73) Assignee: CREATE IT REAL A/S, Aalborg (DK)

( * ) Notice: Subject to any disclaimer, the term of this patent is extended or adjusted under 35 U.S.C. 154(b) by 420 days.

(21) Appl. No.: 18/556,590

(22) PCT Filed: Apr. 22, 2022

(86) PCT No.: PCT/EP2022/060752
§ 371 (c)(1),
(2) Date: Oct. 20, 2023

(87) PCT Pub. No.: WO2022/223809
PCT Pub. Date: Oct. 27, 2022

(65) Prior Publication Data

US 2024/0208151 A1 Jun. 27, 2024

(30) Foreign Application Priority Data

Apr. 23, 2021 (EP) .................................... 21170173

(51) Int. Cl.
*B29C 64/386* (2017.01)
*B29C 64/118* (2017.01)
(Continued)

(52) U.S. Cl.
CPC .......... *B29C 64/386* (2017.08); *B29C 64/118* (2017.08); *B29C 64/336* (2017.08); *B33Y 30/00* (2014.12); *B33Y 50/00* (2014.12)

(58) Field of Classification Search
None
See application file for complete search history.

(56) References Cited

U.S. PATENT DOCUMENTS 5,121,329 A 6/1992 Crump
10,300,659 B2 * 5/2019 Brennan ............... B29C 64/209
(Continued)

FOREIGN PATENT DOCUMENTS

EP 3345742 A1 7/2018
WO 2015102938 A1 7/2015
WO 2020081954 A2 4/2020

OTHER PUBLICATIONS

International Search Report from corresponding PCT Application No. PCT/EP2022/060752, Sep. 23, 2022.
(Continued)

*Primary Examiner* — Ariel Mercado-Vargas
(74) *Attorney, Agent, or Firm* — Workman Nydegger

(57) ABSTRACT

A printer and a method of printing a 3D object are based on a computer model. To allow different engineering properties of the printed object, the printer allows a user input defining at least two portions of the 3D object and a desired engineering property of each portion. The printer is configured to define the lines of an inner structure of the object such that the lines extend continuously across a transition from one of the least two portions into the other portion, and the printer is configured to change the cross-sectional shape of each line in the transition in accordance with the desired engineering properties.

20 Claims, 19 Drawing Sheets

(51) Int. Cl.

| | |
|---|---|
| ***B29C 64/336*** | (2017.01) |
| *B33Y 30/00* | (2015.01) |
| *B33Y 50/00* | (2015.01) |

(56) References Cited

U.S. PATENT DOCUMENTS

| | | | | |
|---|---|---|---|---|
| 11,225,028 | B2 * | 1/2022 | Medalsy | B33Y 50/00 |
| 2012/0241993 | A1 * | 9/2012 | Lipton | B33Y 30/00 264/50 |
| 2016/0075089 | A1 | 3/2016 | Duro Royo et al. | |
| 2017/0050374 | A1 * | 2/2017 | Minardi | B33Y 10/00 |
| 2017/0057164 | A1 | 3/2017 | Hemphill et al. | |
| 2017/0173867 | A1 | 6/2017 | Zappitello et al. | |
| 2018/0169953 | A1 * | 6/2018 | Matusik | B29C 64/124 |
| 2018/0321659 | A1 | 11/2018 | Dasappa et al. | |
| 2019/0061231 | A1 * | 2/2019 | Ho | B29C 67/0007 |
| 2019/0061277 | A1 * | 2/2019 | Shen | B29C 64/386 |
| 2019/0118486 | A1 | 4/2019 | Compton et al. | |
| 2023/0330918 | A1 * | 10/2023 | Leibig | B29C 64/106 |
| 2023/0356467 | A1 * | 11/2023 | Yang | B33Y 50/00 |
| 2023/0356472 | A1 * | 11/2023 | Feinberg | A61L 27/52 |

OTHER PUBLICATIONS

Extended European Search Report from corresponding EP Application No. 21170173.5, Oct. 1, 2021.

* cited by examiner

FIG. 6

61

62

| shore_A | line_width |
|---|---|
| 10 | 0.3mm |
| 20 | 0.4mm |
| 30 | 0.5mm |
| 40 | 0.6mm |
| ... | ... |
| | |
| | |
| | |
| | |

PRINTER FOR PRINTING A 3D OBJECT BASED ON A COMPUTER MODEL

INTRODUCTION

The disclosure relates to a printer for printing 3D objects based on a computer model. The printer comprises a stage, an extruder configured to extrude material, and a controller. The controller is configured to define the 3D object with an outer contour determined by the computer model and with an inner structure defined by a pattern of lines.

Relative movement between the stage and the extruder is controlled by the controller to create the defined pattern of lines.

BACKGROUND

Additive manufacturing (AM), commonly called 3D printing, is a technology which allows creation of objects from computer 3D drawings.

The process includes slicing a solid model to form 2D slices and printing the object by making layers which each correspond to a slice. One by one, the layers are created by the printer such that one layer is arranged on top of the previous layer. Since each layer has a given thickness the real object gains volume every time a layer is added. Different technologies exist including extrusion-based, granular based, light polymerization based, or lamination based. Each of the technologies uses different types of materials and different ways of making the layers, but they all apply the principle of guiding a tool, or a part of a tool, herein referred to as a shape defining structure, along a path defined from the slice of the solid model. During the process, the material is arranged in accordance with the shape of the slice. The material is typically a polymer, a metal alloy, a plaster, or a photopolymer.

In the known printers of this kind, the object is created on a stage, and the shape defining structure is moved relative to the stage. Often, the shape defining structure is moved by a manipulator and/or the stage is moved by an actuator. One or both of the manipulator and actuator may move in x, y, or z direction of a Cartesian space.

The most common extrusion-based AM technology is Fused Deposition Modelling. This technology is sometimes referred to as FDM, and it has the equivalent name Fused Filament Fabrication FFF. The principle of this extrusion technology is to extrude melted material, usually thermo-polymer filament, while following a path defined from the slice, and layers of the object are thereby created. U.S. Pat. No. 5,121,329 provides an example of this technology.

A common granular based AM technology is Selective Laser Sintering (SLS) which is based on spherical polymer or metal powder elements being sintered together by laser. A layer of powder is applied, and the layers of the object are selectively sintered. Subsequently, a new layer of powder is applied, and the process is repeated.

Another common granular based AM technology is Electron Beam Melting (EBM) which is a type of Selective Laser Melting (SLM) used for the direct manufacturing of fully dense metal parts by melting metal powder with an electron beam in high vacuum. The principle is generally identical to that of SLS but the metal powder is totally melted and not only sintered.

Powder bed and inkjet head 3D printing is based on an inkjet print head selectively arranging a binding agent onto a bed of powder e.g. plaster.

The most common light polymerization technologies are:

Stereolithography (SLA) where photopolymer liquid resin is hardened by UV light or laser. The laser draws the shape of the path which is defined based on the slice and thereby creates a hardened layer. Subsequently, photopolymer liquid is added, and the shape of the subsequent slice is drawn by the laser until the object is created.

Digital Light Processing (DLP), in the additive manufacturing context, is similar to SLA where a DLP projector is applied instead of a UV light beam or laser to harden a photopolymer layer by layer.

The most common lamination-based AM technology is Laminated Object Manufacturing (LOM) where sheets of a material, e.g. paper, plastic, or metal, are joined adhesively layer by layer and subsequently cut to define the shape of the object.

It is generally desired to create 3D printed objects complying not only with dimensional requirements but also complying with specific functional requirements. Such functional requirements may be complied with by engineering properties relative to hardness, elasticity, or conductivity etc. In the following, referred to as “engineering properties”.

Methods and devices exist where additive manufacturing techniques are applied for producing a cellular structure while controlling dispensing of the material to form the cellular structure with a non-uniform relative density or cell geometry across the cellular structure. Some of the existing methods claim thereby to control collapse with selectable stiffness characteristics. The cellular structure is often a hexagonal or honeycomb like structure with lines extending only in very shortly before becoming intersected or joined with other lines.

Even if such existing methods directed to cellular structures should enable engineering properties, the existing technologies have shortcomings making its use outside of a laboratory questionable.

The existing methods generally apply continuous mathematical functions spread over the whole object. While this solution may appear elegant, it limits the applicability in practise.

The existing methods directed to cellular structures and continuous mathematical functions may often adequately solve a problem related to technical implementation and simplicity. However, since they typically rely on distorting the cellular structure pattern to change density, the change in shape also unintentionally changes hardness in addition to the change in density. A hexagonal shape, taken as an example, and e.g. having 1:1 overall aspect ratio will have very different mechanical properties to a heavily distorted hexagon with a 10:1 overall aspect ratio. This unintentional side effect makes the existing method less reliable and controllable and less flexible when it comes to ensuring a specific hardness. Allowing full design freedom for the end user with this method can produce extreme distortion of the pattern rendering the solution useless in many cases.

Some existing methods apply to a grid structure defined by a plurality of short individual lines. The intersections of these lines are then used to define the points of change in thickness where each line has a set thickness. This method heavily limits the flexibility and usefulness of the resolution since the points of transition in hardness must coincide with the grid pattern. In practice the printing of these grids is impractical with FDM printers as they require complex paths with frequent stops and starts in extrusion. As anyone well versed in the art will tell, these abrupt changes in the extrusion cause issues with the quality of the end product and the reliability of the printer.

SUMMARY

To improve the ability to design and print objects complying not only with dimensional requirements but also complying with specific functional requirements, the disclosure in a first aspect provides a printer and in a second aspect provides a method of printing 3D objects according to the independent claims, and optional features according to the dependent claims.

Since the lines extend continuously, and the change in engineering properties are achieved by a change in line width of a continuous line, the change in property can be controlled more precisely, and a more abrupt change can be achieved. Accordingly, the ability to achieve specific functional requirements is improved.

The specification of a line extending continuously may specifically require that the line is not intersected or joined by other lines at the transition, i.e. it extends unbroken and un-interfered by other structures across the transition. The lines could be joined with other lines or intersect walls outside the transition, but in the transition, the lines are continuous and the cross-section is changed according to the engineering property.

The controller is configured to determine, e.g. by calculation or by tables of predetermined values, a change in cross-sectional shape of each line at locations being remote from intersections with other lines, and controls the extrusion and movement to subsequently print those lines with the changing cross-sectional shapes in the transition.

The change in line width of a continuous line when crossing the transition between discrete regions can potentially create a sharp transition between clearly defined zones of arbitrary shapes. This is more intuitive for the end user and provides greater design flexibility as compared with the known methods applied on cellular structures by use of continuous functions and applied to redefine a cellular structure density rather than redefining a cross-section change of a line at a location away from junctions with other lines as claimed herein.

Additionally, the change in line width of a continuous line when crossing the transition between discrete regions can limit the number of continuous lines going from wall to wall with no intersections where the changes happen within lines and not at junctions between lines. This suits the natural behaviour of the filament extruder-based printing much better resulting potentially in increased speed, reliability, and quality. This effect may be particularly pronounced in connection with FDM printers.

The computer model used by the printer could be a traditional CAD model, particularly a solid model in 3D.

The printer could be a traditional extrusion-based printer with stage, i.e. a platform on which the object is printed, and particularly the printer could be a FDM printer. The platform is movable in a Z-direction and thereby defines a slicing plane. Each time a slice of the object is printed, the platform moves down, or the extruder moves up, and a new slice is printed.

The extruder may be a traditional extruder configured to receive a thread of a material, typically a polymer material, which is melted and extruded.

The controller could be constituted by a computer processing unit and compatible computer program software enabling the processor to carry out the defined steps. It could also be a computer processing unit which is hard coded to carry out the steps.

The controller is configured to define the 3D object with an outer contour determined by the computer model and with an inner structure defined by a pattern of lines. Each line is subsequently defined physically by the lines which are extruded by the extruder, and they extend in a lengthwise direction and has a cross-sectional shape, a line width, and a line height.

Herein, cross-sectional shape of the line means a shape when the line is seen in a cross-section perpendicular to the lengthwise direction of the line.

The controller can control movement between the extruder and the stage. Herein, this movement is referred to as "relative movement". The relative movement may be controlled in an X-direction, a Y-direction, and a Z-direction.

By definition herein, the Z-direction is perpendicular to the slicing plane, the Y-direction is perpendicular to the Z-direction, and the X-direction is perpendicular to the Z-direction and to the Y-direction. The X-Y plane is thereby parallel to the surface of the stage, and the line width is a dimension in the X-Y plane while the line height is a dimension in the Z direction.

The stage may typically be plane surface parallel to the slicing plane, and the Y,X directions are directions in the slicing plane.

By extrusion of material during relative movement, the printer creates the defined pattern of lines.

The controller may be configured to read a user input defining at least two portions of the 3D object and a desired engineering property of each of the at least two portions. One portion of the 3D object may e.g. be harder than another portion of the 3D object, or it may generally have other characteristics, e.g. softer, or more elastically deformable.

The controller can define the lines of the inner structure such that they extend continuously across a transition from one of the at least two portions into another of the at least two portions, and to change the cross-sectional shape of each line in the transition in accordance with the desired engineering properties.

The controller may be configured to define slices of the 3D object, where each slice is defined with a 2D outer slice contour determined by the computer model and an inner 2D slice structure defined by the pattern of the lines. The controller may be configured to print each layer of the object in accordance with the defined slices, i.e. such that each printed layer constitutes a slice of the 3D computer model.

The slices may have a uniform thickness in the z-direction, or the slices may include portions of reduced or increased thickness. To provide an upper surface being plane, portions having a lower thickness can be compensated by adding more layers on these portions.

The cross-sectional shape defines a line width perpendicular to the z-direction and a line height in the z-direction. The change in cross-sectional shape of the lines may particularly refer to a change the line width or to a change of the line height.

To obtain the change in cross-sectional shape, the controller may be configured to change the speed of the relative movement between the stage and the extruder. Alternatively, or in combination, the controller may obtain the change in cross-sectional shape by changing the speed by which the extruder extrudes the material. This, however, is typically less precise compared to the controlling of the speed of the relative movement. The controller may therefore predominantly control the change in cross-section in the transition by changing the relative movements since this may provide a more sharp transition between the two different cross-sections on opposite sides of the transition.

Alternatively, or in combination with a change in speed and/or a change in extrusion rate, the controller may be configured to define the changing cross-section by a change in a distance between the stage and the extruder.

The cross-section of the lines may determine the area by which one layer bonds to an adjacent layer. This may be important for the strength of the printed 3D object. The controller may be configured to determine a bonding strength identifier. Herein, this bonding strength identifier is an identifier which defines strength by which each layer of the object bonds to the adjacent layers of the object. The controller may determine this identifier based on the cross-section of the line.

The controller may be configured to amend this bonding strength by changing the distance between the stage and the extruder while keeping the line width constant, i.e. keeping the dimension in the X-Y plane perpendicular to the z-direction constant. In that way, the line width and thus the area by which one layer is bonded to an adjacent layer can be changed.

Different patterns may be defined, and the controller may be configured:

to select between a plurality of patterns each being defined by a predefined range of obtainable engineering properties, and to define the inner structure with a pattern selected based on the desired engineering properties.

Accordingly, the controller may have several predefined patterns and be configured to select one or more of the predefined patterns based on the desired property. The pattern could be changed in the transition between the two portions for which different engineering property is desired.

The difference between two patterns between which the controller is to select, may relate to the density provided by the pattern. Two patterns may thus be defined by the controller based on differences in density obtained by the patterns and the engineering property, particularly the Hardness (shore A) may be determined as a range obtainable with a specific pattern density by varying the line width. The controller may be configured to define the pattern density and based thereon to select a line width to obtain a specific hardness.

The controller may be configured to change the line width within a predefined line width range, and wherein each pattern is defined within the line width range. In this way, one pattern may be selected for all line width, e.g. within a range between line width a and line width b. Another pattern may be selected for all line width in another range, e.g. a range between line width b and line width c etc. The predefined ranges of line width for predefined patterns may be pre-programmed into the controller such that the pattern is defined once the line width is selected.

As an example, the controller may have 2 different predefined patterns, i.e. pattern no. 1 and pattern no. 2. Pattern no. 1 is applied for line width between 0.2-0.8 mm and pattern no. 2 is applied for line width between 0.8 mm and 1.3 mm. etc.

The controller may be configured to define the inner structure with the same pattern for all of the at least two portions of the 3D object and only amend the cross-section of the line, or the controller may be configured to define the inner structure with different patterns for the at least two portions of the 3D object.

The patterns may particularly be 2D patterns forming the 3D object in layers.

The controller may be configured:

to select between a plurality of materials to be extruded by the extruder, each material being defined by a range of obtainable engineering properties, and to define the inner structure with a material selected based on the desired engineering properties.

Particularly, the controller may be pre-programmed with different materials, and for each material, different pre-defined cross-sections, e.g. line width or line heights are predefined to provide different engineering properties.

Correspondingly, the controller may be pre-programmed with different materials, and for each material, different pre-defined patterns, are predefined to provide different engineering properties, e.g. within a range of line width.

As an example, the controller may be pre-programmed with material A and B. For material A, it may have a pre-defined definition of different cross-sections for different engineering properties. In one example, a line width of d may provide a hardness of x.

The height of the layer has an impact on the amount of material which must be extruded. If the layer is very high, the printer may reach an upper limit for the extrusion rate, or the relative movement between the extruder and the stage will have to be very slow. If the printer operates near a limit for the extrusion rate, it may be difficult to adjust the cross-sectional shape of the line, and thus be difficult to obtain a desired engineering property.

The controller may be provided with data defining a maximum extrusion rate. In this embodiment, the controller may be configured to define a height of at least a portion of at least one of the slices of the 3D object based on the maximum extrusion rate and the cross-sectional shapes of each line in the at least two portions having different engineering property. This feature may allow the controller to reduce the height of the slice and thus reduce the layer height. This may reduce the extrusion rate, and thus improve the ability to adjust the cross-section of the line and thus the ability to reach a desired engineering property.

The line widths of two lines in adjacent layers have an impact on the ability of the lines to adhere onto each other. If the line width is too small, the contact area between adjacent lines in different areas becomes small, and that may influence the bonding strength between the layers.

The controller may comprise data which defines a minimum bonding area between lines in one layer and lines in an adjacent layer. In this embodiment, the controller may be configured to define a height of at least a portion of at least one of the slices of the 3D object based on the minimum bonding area and the cross-sectional shapes of each line in the at least two portions having different engineering property.

This will allow the controller to reduce the layer thickness and thus allow a larger line width and thus improve the bonding strength between layers.

The controller may be configured to change a path of the line in the transition. Particularly, the path may be changed from a single-pass section in which the line contains only one segment extending in one direction, to a multiple-pass section in which the line contains multiple segments extending back and forth in opposite directions. The controller may be configured to create the multiple-pass section and the single-pass section with different dimension in a direction perpendicular to the Z-direction and with the same dimension in the Z-direction, alternatively to create the multiple-pass section with a larger or smaller dimension perpendicular to the Z-direction than the single-pass section.

The multiple-pass section may be created with an uneven number of segments, e.g. 3, 5, or 7 segments. This will allow the multiple-pass section to become sandwiched between two single-pass sections or between a single-pass section and a different multiple-pass section, or between two multiple-pass sections having different numbers of segments. This will create a continued line structure.

The controller may alternatively create the multiple-pass section with an even number of segments, e.g. 2, 4 or 6 segments. In this case, the multiple-pass section will terminate the line structure.

The controller may be configured to change the cross-sectional shape of each line in the transition to create a multiple-pass section adjacent to a single-pass section. Particularly, the controller may change the multiple-pass section such that a single-pass section and an adjacent multiple-pass section has nearly an identical overall cross-section.

The controller may be configured to arrange the line segments of the multiple-pass section in a horizontal row of line segments or in a vertical row of line segments.

The controller may be configured to define the lines of the inner structure such that they extend as continuous straight lines across the transition or extend as continuous sinusoidal lines across the transition, e.g. such that they extend continuously, i.e. not intersected by other lines, between walls of the outer contour of the 3D object. Sinusoidal, herein means any kind of wave-shaped, non-linear shape of the line, e.g. an exact sinus-shape.

One problem related to strength may arise if the contact surface between 2 adjacent layer is lower than the average surface contact between layers. This creates a weakness at this particular layer junction. It is experienced that the object may collapse over time under stress. The internal structure, i.e. the continuous lines, does not retain their shape and may collapse after the object has been mechanically stressed over time.

The above problem may be relevant e.g. when using the printer and method for printing flexible or soft objects such as insoles or inlays of shoes.

To solve the problem, it has been found that lines of the inner structure may be defined such that lines of one slice may have a larger cross-sectional size, e.g. a larger width or height, than lines in an adjacent slice. In one embodiment, the layered structure may comprise one layer with relatively wide lines, e.g. wide sinusoidal continuous lines and that layer is followed by 1, 2, 3, 4, 5 or more layers with less wide lines, then followed by a layer with wide lines etc.

Still not wishing to be bound by theory, the problems may alternatively be caused when making a layered structure where one layer has one layout of the continuous lines, and another subsequent layer has a different layout.

In extrusion technology, a line is deposited as the nozzle move in the plane. This creates a line printing direction, and this direction may importantly influence the cross-section when changing the line width during movement. Particularly, the change of cross-sectional shape of each line in the transition can never be instantly. Due to mechanical properties of the extruder and/or the mechanical system creating the relative movement between the extruder and the stage, there will always be a gradient of some degree, i.e. a duration from the time where the cross-sectional shape change is initiated until it is effected.

This inherent gradient can be reduced but is always present in extrusion technologies. If the direction in which the line is created changes, the gradient may cause distortion of the desired transition.

In one example, the lines in the transition is created by alternatingly extruding from right to left, and from left to right. In this case, the gradient will create a zig-zag pattern of the transition.

To compensate for this effect, the controller may be configured to define the pattern of lines in the transition by lines being deposited in different directions and wherein the controller is configured to counteract a delay in the extrusion of material or relative movement between the extruder and the stage such that the change of the cross-sectional shape of each line in the transition is initiated at different locations relative to the transition to thereby obtain a homogeneous cross-sectional shape of lines deposited in different directions along the transition.

In a second aspect, the disclosure provides a method of controlling a 3D printer for printing a 3D object based on a computer model. The printer is of the kind described above, i.e. relative to the first aspect of the disclosure.

The method comprises:

- defining at least two portions of the 3D object and a desired engineering property of each of the at least two portions,
- define an inner structure with lines extending continuously in a transition from one of the at least two portions into another of the at least two portions, and defining a change of the cross-section, e.g. the line width, in the transition, wherein the change of cross-section is defined in accordance with the desired engineering properties.

Accordingly, the method may include the step of defining the desired engineering properties, defining the desired transition, defining a change in cross-section in the transition to match the desired engineering properties, and finally to control the printer to print the defined structure.

The method may include any of the steps implicit for the controller considering the configuration of the controller described relative to the first aspect of the disclosure, particularly, but not limited to the step or steps of:

- defining the inner structure with lines being sinusoidal;
- defining the inner structure with layers such that each layer comprises lines separate from lines of adjacent layers, and at least one layer comprises lines which are wider than adjacent lines of adjacent layers;
- defining the inner structure not to form a hexagonal or a pentagonal cellular structure but rather with lines extending between the walls forming the outer shape of the 3D object;
- using the method for making an insole or an inlay of a shoe; and
- using the method in combination with an FDM printer.

LIST OF DRAWINGS

In the following, the disclosure will be explained in further details with reference to the drawings in which:

FIG. 6 illustrates an example look up table correlating hardness to line width;

Figure 19A:
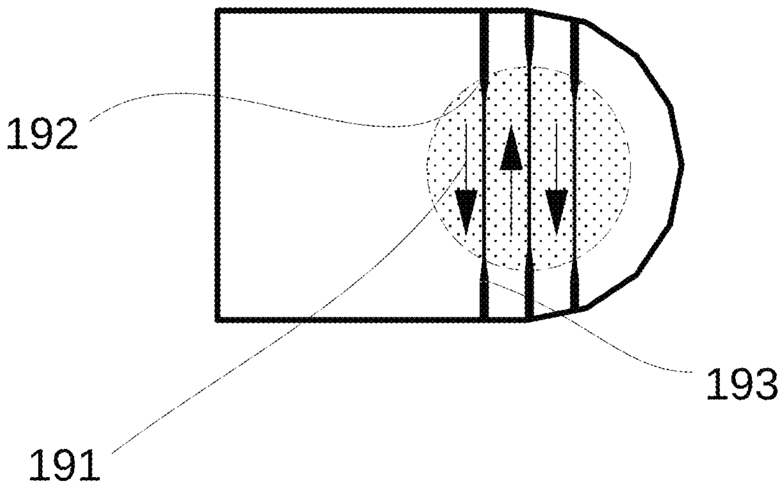
Figure 19B:
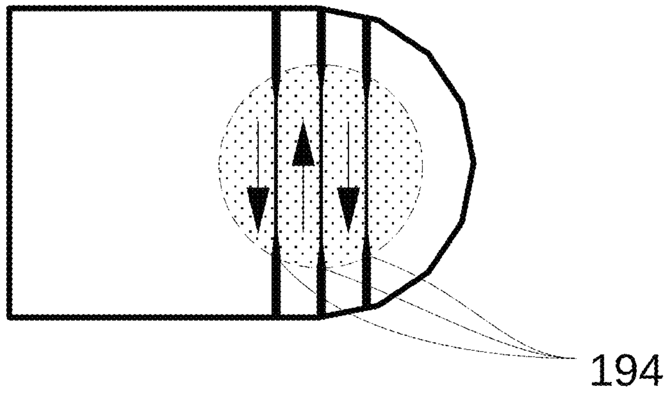

FIGS. 18*a-d* illustrate special considerations to increase overall strength, e.g. an inlay or insole of a shoe; and FIGS. 19*a-b* illustrate special considerations related to problems concerning a delay in the mechanical system causing an undesired gradient.

DESCRIPTION OF EMBODIMENTS

The detailed description and specific examples, while indicating embodiments, are given by way of illustration only, since various changes and modifications within the spirit and scope of the disclosure will become apparent to those skilled in the art from this detailed description.

The method and apparatus of the present disclosure is applicable to any system where different engineering properties are required, but it is particularly applicable to extrusion-based additive manufacturing systems where the extruded material has special properties like being flexible, translucent or electrically conductive.

Figure 1:
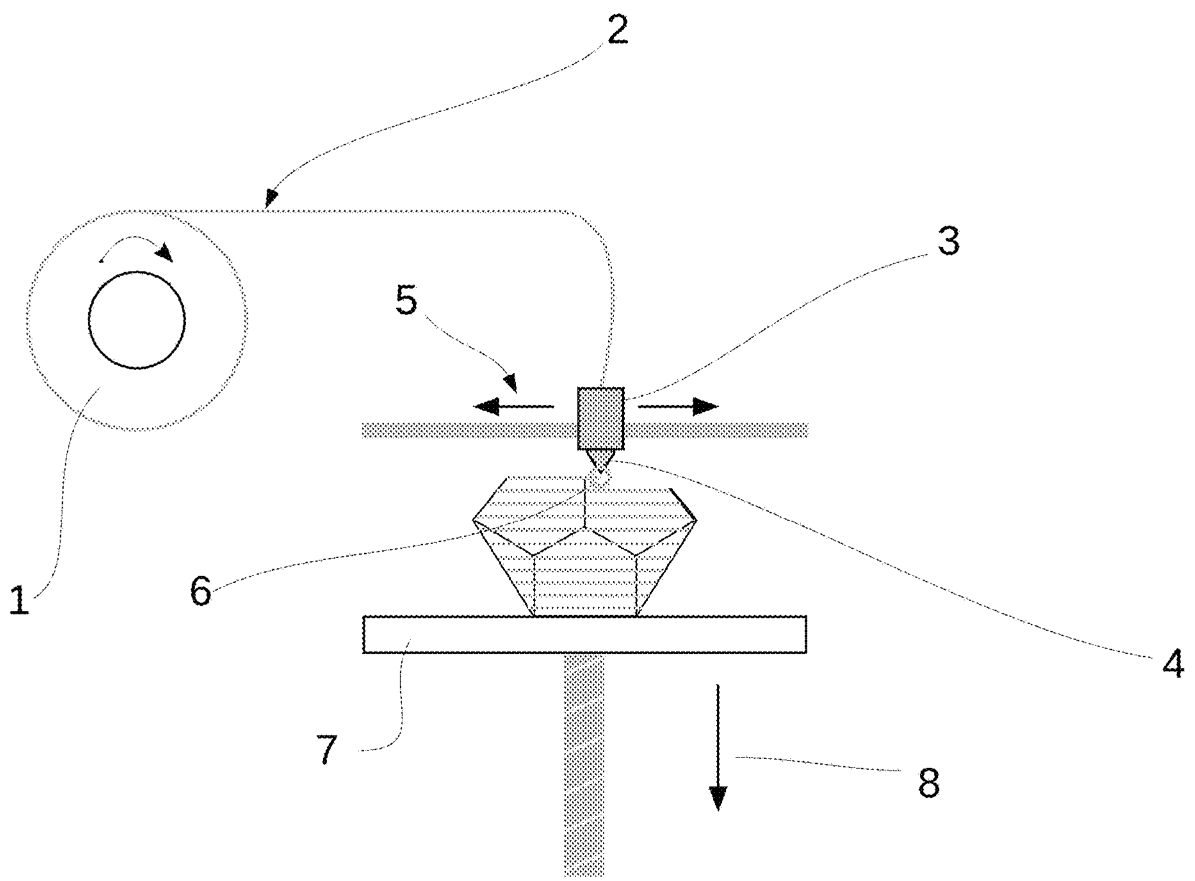
FIG. 1 illustrates an FDM printer.

FIG. 1 illustrates an extrusion-based printer (FDM). The illustrated printer comprises a filament supply 1 in the form of a spool of thermo-polymer filament. The filament 2 is supplied by a feeding motor (not shown) to the extruder 3. The feeding motor is controlled by a tool command. The extruder 3 comprises a nozzle 4 and an electrical heater (not shown). The heater is also controlled via the tool command. In this embodiment, the tool is constituted by the filament supply and the extruder including the nozzle and heater, and the shape defining structure is the nozzle. The extruder 3 is fixed to a motion structure which can move the extruder, heater, and nozzle in two directions of a Cartesian space illustrated by the arrow 5.

The nozzle is moved in accordance with a path defined from a slice of the 3D object to be printed. The shape defining structure of the tool, i.e. in this case the nozzle 4, has a tool position, and the tool position determines the corresponding adding-position 6 where the material is added in the form of extruded lines.

In this way, layers corresponding to the slices are defined and multiple layers defines the 3D object.

When one layer is finished, the stage 7 is moved downwards as indicated by the arrow 8.

Figure 2:
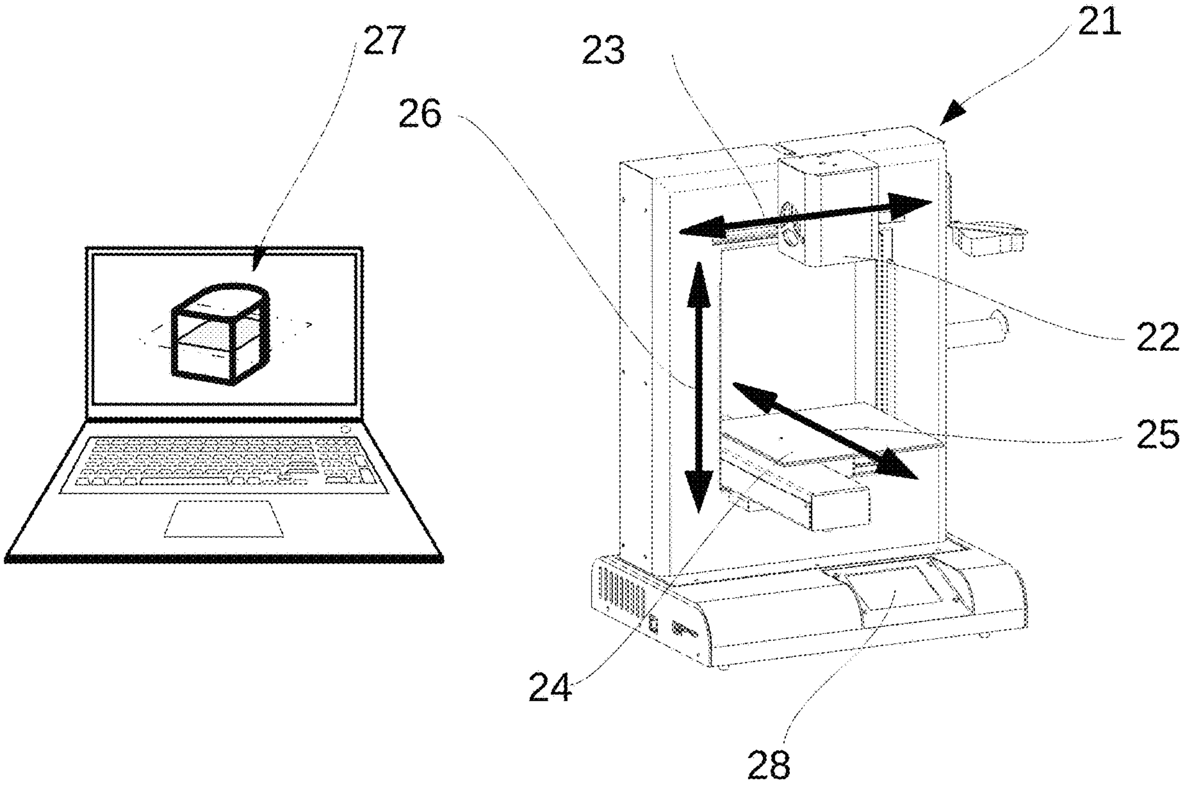
FIG. 2 illustrates a specific embodiment.

FIG. 2 illustrates this printer 21. The tool 22 is extrusion based. The tool comprises an extrusion head, a material supply, and an interface. The tool-position, i.e. the positioning of the extrusion head, is achieved by moving the tool in one direction providing one of the axis 23 (X coordinate) and independently moving the stage 24 in two other directions providing the other two axes. The Y axis is indicated by arrow 25 and the Z axis is indicated by 26. This provides the ability to control the relative position of the tool in 3 independent dimensions allowing for creation of any arbitrary three-dimensional path. The actual positioning is accomplished using timing belts, pulleys, and stepper motors operated in an open loop configuration and constituting the motion structure.

By definition herein, the width of the lines is a dimension in the X, Y plane, whereas the height of the lines is a dimension in the Z direction.

In this example, the controller comprises slicing software running e.g. on a personal computer 27 and a micro controller 28, built into the printer. The controller is connected to the motion structure which receives motion commands via the interface. Based on the commands, it moves the stage relative to the tool and thereby defines the shape of the layer.

The slicing software, sometimes referred to as the slicer, generates motion instructions for the micro controller based on the supplied object geometry.

The synchronization of movement of the motors is handled by the micro controller based on information received from the slicer.

The slicer takes the geometry 31 supplied by the user using a 3D file format (for example .stl, containing triangles that describe the object).

In addition to the geometry, the slicer also takes a series of volumes 33, corresponding to the shape of a region of desired engineering property, as input.

Engineering property in this context means any property that might make the object more suitable for a specific industrial application including but not limited to:

- Elasticity
- Hardness
- Translucency
- acoustic properties
- sintering behaviour (thermal expansion)
- stress, strength, elongation
- thermal and electrical conductivity
- density And excluding visual properties like colour, texture, and external shape.

The intersection section 34, i.e. in the overlap between the volumes 31 and 33, defines a region of a specific, discrete, engineering property.

The volumes could be supplied by the user using a 3D file format (for example .stl, containing triangles), and the desired property could be defined using the user interface of the slicing software.

Alternatively, the volumes could define the desired regions using a series of voxels arranged in a field or grid-like pattern.

These volumes may be associated with a scalar field to specify the properties with an even higher resolution.

In either of these embodiments, it is possible to create a series of neighbouring incrementing or decrementing regions to achieve a perception of a smooth transition of engineering properties of the printed object.

Based on the supplied geometries the slicer generates 2D slices 32 of the 3D shape at predefined heights.

Based on these 2D slices 32, a set of line segments 41 are described where material should be deposited to create the desired geometry. Accordingly, the adding-position should follow all line segments while the tool is activated.

Figure 3:
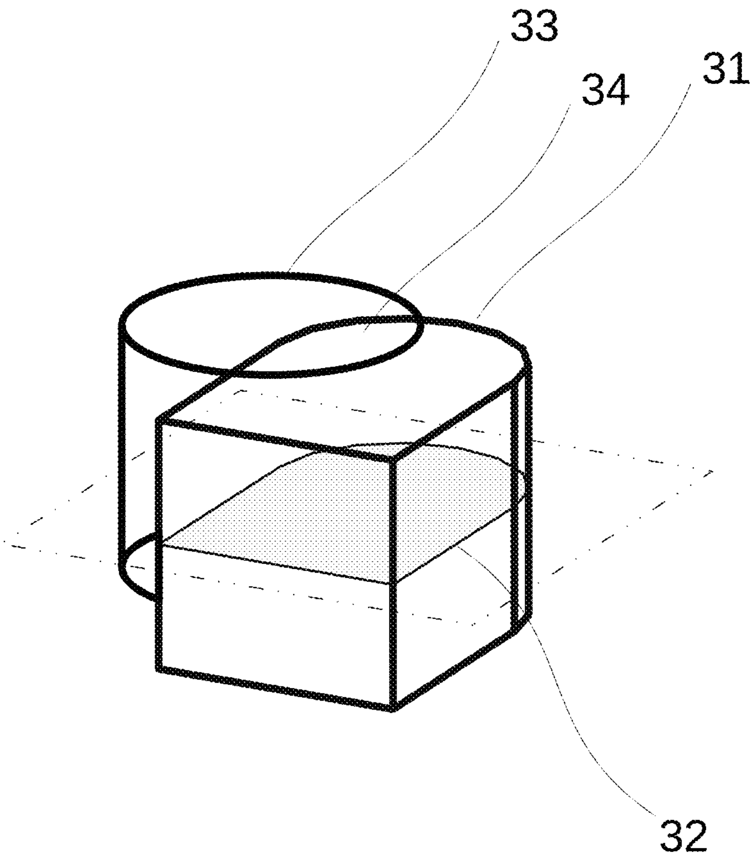
FIG. 3 illustrates slicing of an object.
Figure 4:
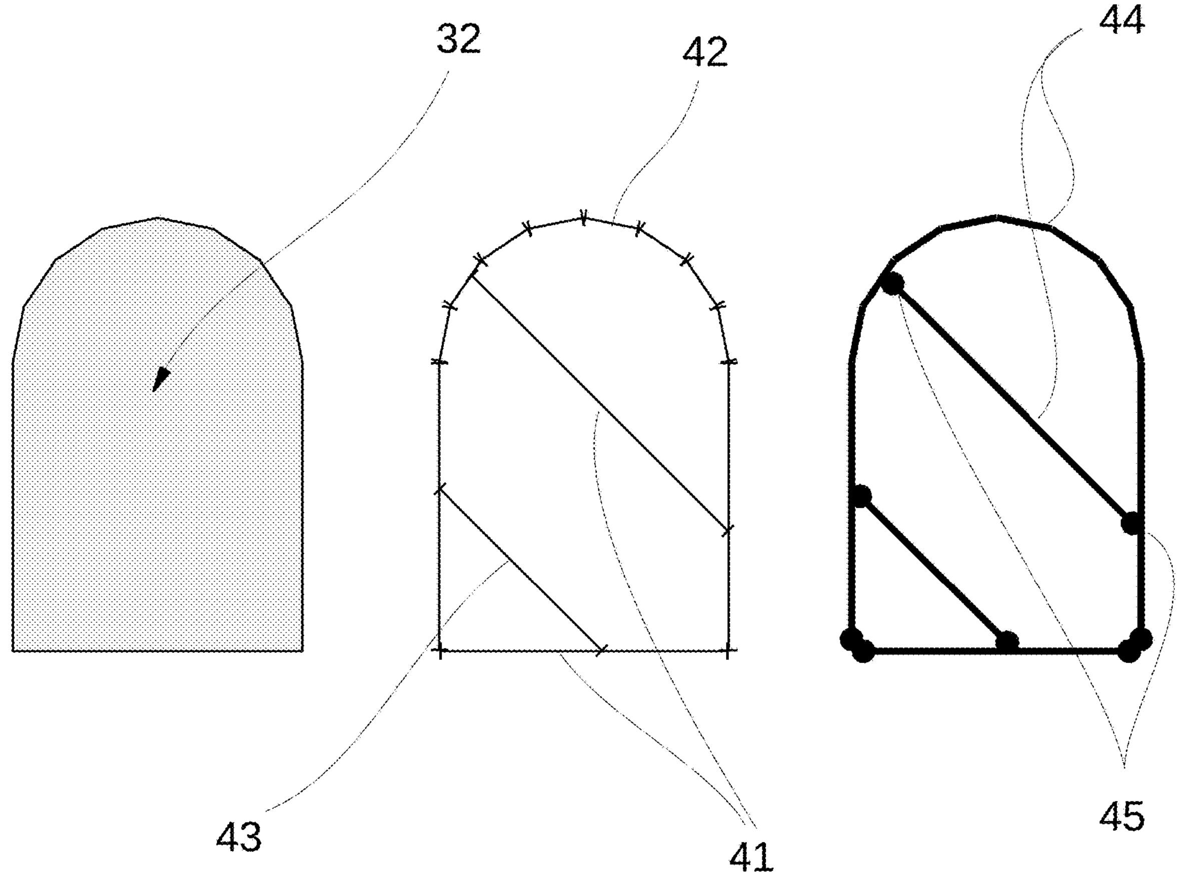
FIG. 4 illustrates the generation of line segments from slices.

This process will then define e.g. the outer surface of the object 42 or the inner structure of the object 43. FIG. 3 illustrates a shape of a layer as it is defined in the shape data. FIG. 4 illustrates the corresponding list of contiguous line segments 44 obtained by splitting the shape into a plurality of line segments.

Figure 5:
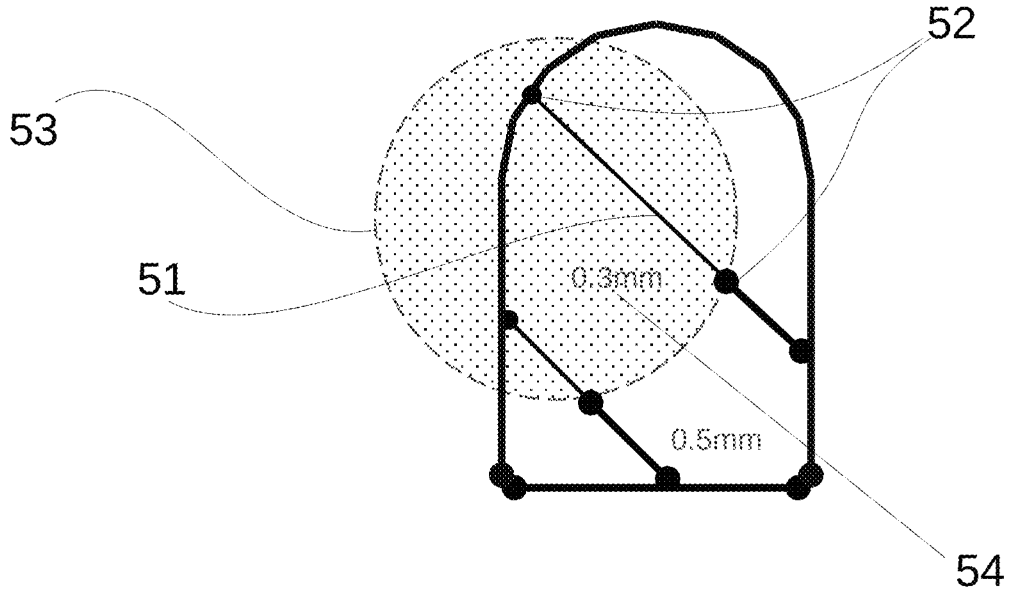
FIG. 5 illustrates the further subdivision of line segments based on regions.

Additionally, the line segments are further divided into sub-sections based on the previously defined regions. This is illustrated in FIG. 5.

A new sub-section 51 is created for each intersection 52 with a region 53. Once the sub-sections are created the slicer defines a desired line width 54 based on the desired engineering property of the region.

This can be done for only the inner structure, the outer surface, or both as the application requires.

The conversion from an engineering property to a deposition width can be accomplished by various means for example using a mathematical formula describing the relation or by means of a look up table containing empirically determined value pairs.

In a specific example, e.g. for the creation of a sole or insole, the lines width of the inner structure can be defined by the use of series of volumes 33 (e.g. an import of 3D geometries to be used as line width modifiers). The geometry 31 can then be assigned a specific target shore hardness 61 defining the desired hardness of the insole. The series of volumes 33 can then be overlapped in a 3D environment to create intersection sections 34. Each volume 33 can then be assigned a different shore hardness 61 than the geometry 31. The controller will then match the desired shore hardness to a reference lookup table (made by collection of empirical data and extrapolation) to define the target line width in the specific portions.

FIG. 6 shows an example look up table, correlating Shore A hardness 61 to line width 62 when using a flexible TPU based filament.

Figure 7:
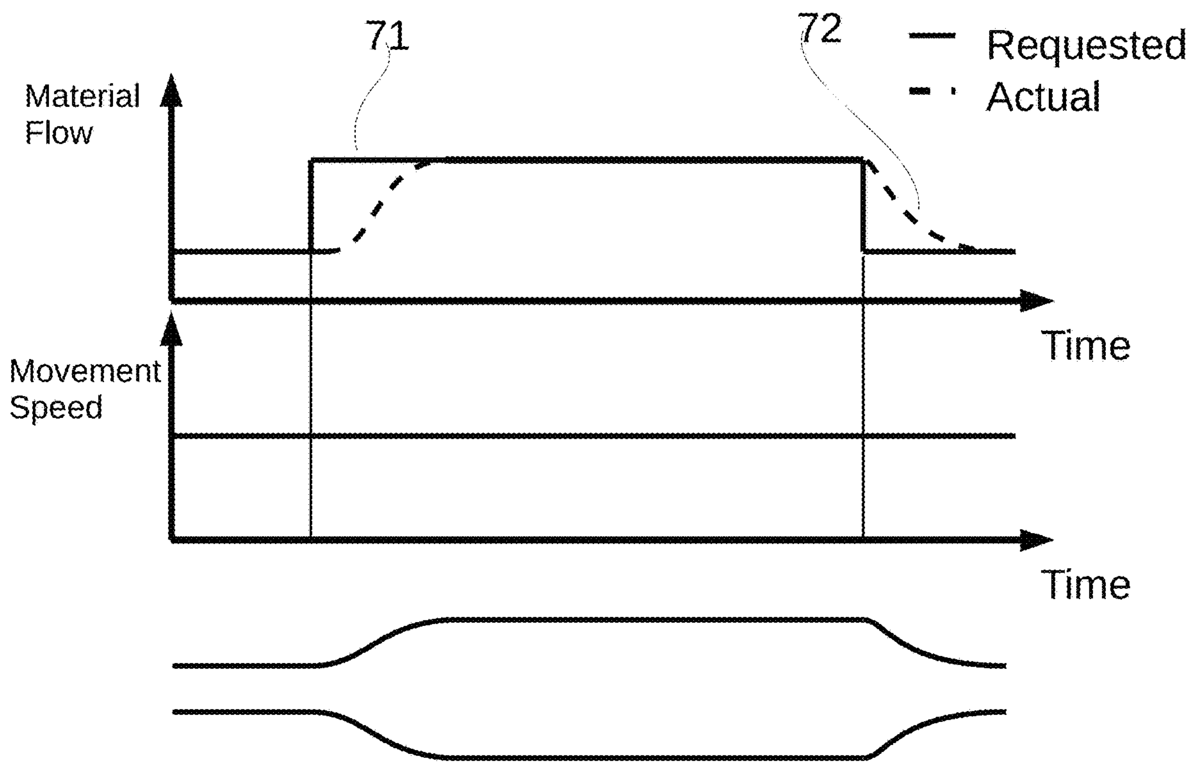
FIG. 7 illustrates the problem encountered when using extrusion rate to modulate the line width.

FIG. 7 illustrates a potential consequence of modulating the line width by increasing or decreasing the material flow 71 of the extruder, e.g. while keeping the movement speed constant. Even on the current state-of-the-art extrusion-based printers, the response to change in extrusion flow and/or temperature is delayed. This is illustrated by the less steep line 72. This potentially leads to an inaccurate line width and a deviation between the desired engineering property and the obtained engineering property.

It is however possible to change the line width without changing the extrusion flow or temperature.

Figure 8:
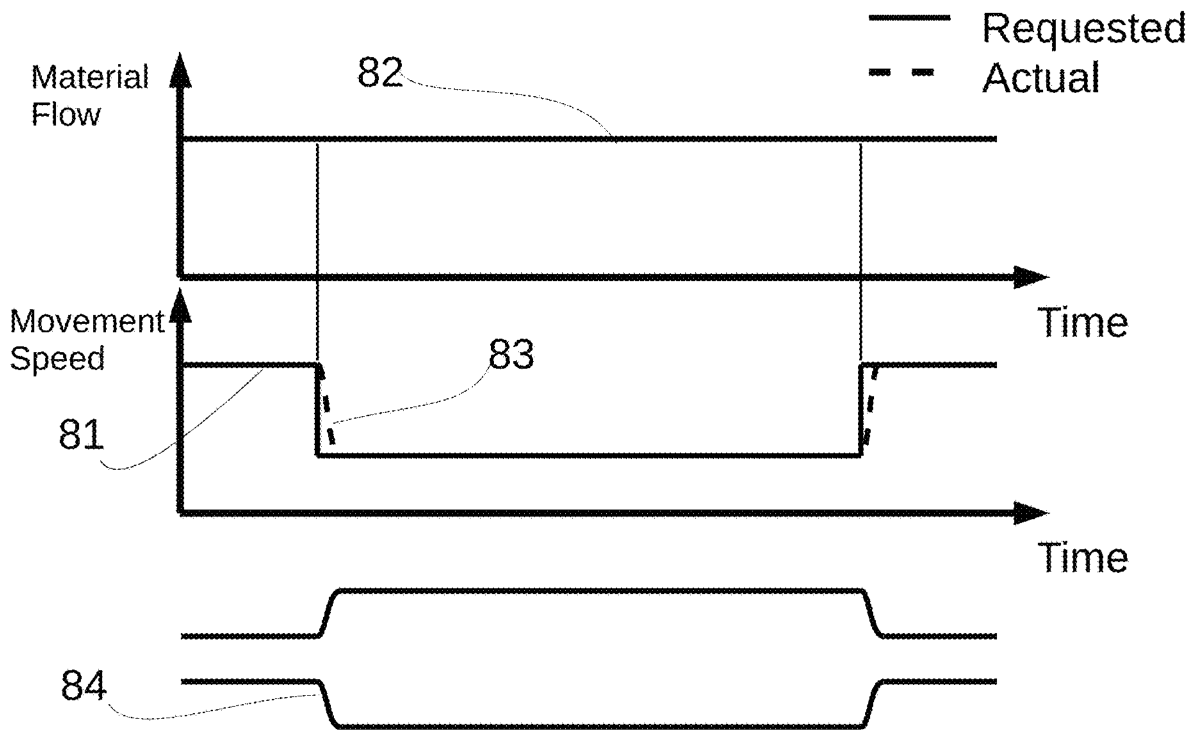
FIG. 8 illustrates the improved response when using the movement speed to modulate line width.

FIG. 8 Shows an example of how this could be implemented.

By modulating the relative speed 81 of the motion platform to the extruder (in the X and Y plane) and/or by the distance between the platform and the extruder (the layer height) while keeping the extrusion rate constant 82 a similar effect can be accomplished.

Since the response time of the motion platform is significantly lower, illustrated by the steep line 83, this technique makes it possible to create fast, controlled transitions 84 and thereby reduce the difference between the desired line width and the obtained line width.

Figure 9:
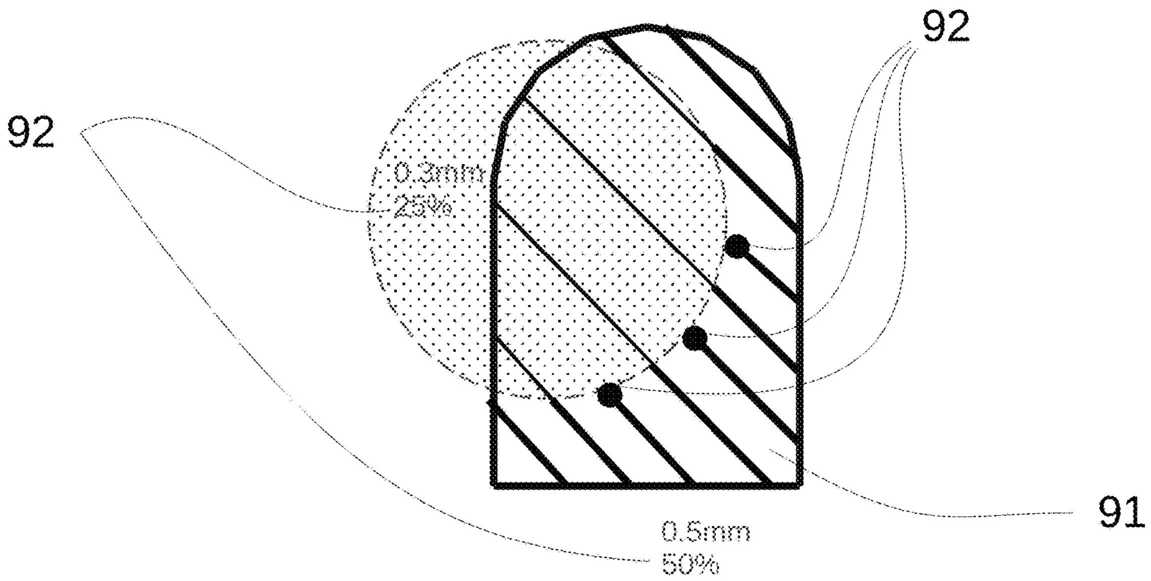
FIG. 9 illustrates the problems with also changing the internal structure or pattern density to enhance the effects of line width changes.

FIG. 9 illustrates an implementation where the line width is modulated in conjunction with modulating the pattern of the inner structure 91 of the object.

If the object is to achieve a varying level of hardness or strength, one approach would be to increase or decrease the density 92 of the inner structure.

In FIG. 9, the pattern is changed in such a way that a discontinuity 93 of the lines is created. The discontinuity is located where the density of the pattern changes. This results in an undesired unpredictability of the physical properties in these boundary regions—mainly due to the ability of the discontinued lines to displace.

Another approach to achieve a similar effect is to use a three-dimensional pattern such as Gyroid Lattice by which flexibility and strength is not only defined by the material but also defined by the geometry, or at least to make a pattern with lines being continuous through the transition between two portions with different line thickness and thereby different engineering properties.

Figure 10:
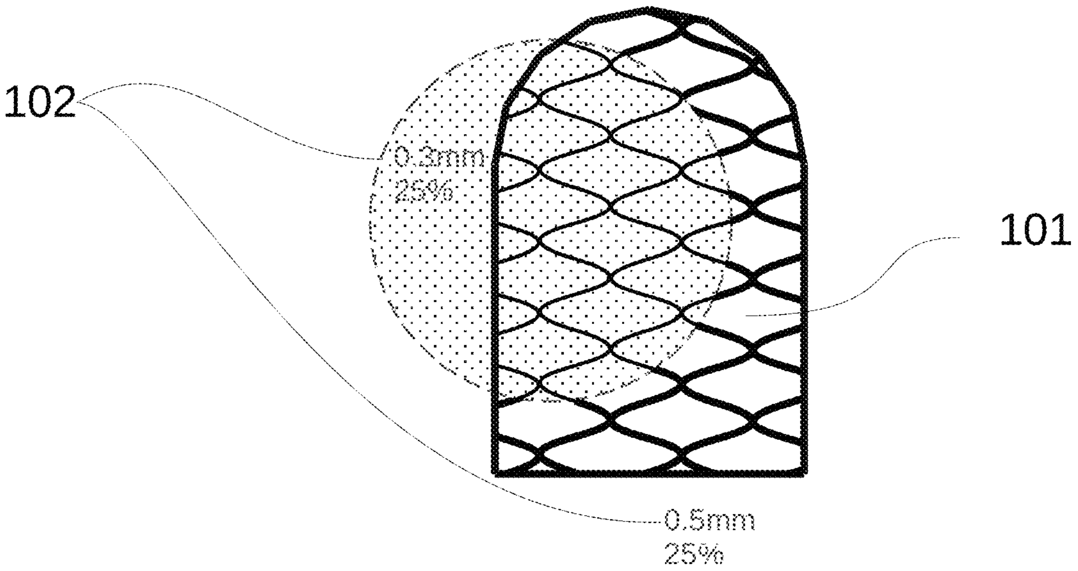
FIG. 10 illustrates an example implementation of an improved way to enhance the effect of line width changes.

FIG. 10 illustrates this method with lines having a sinusoidal shape.

Once a suitable pattern 101 like this have been found, a singular pattern density, allowing for the required range of hardness's, can be chosen empirically or by other methods. Afterwards, one can change the overall flexibility by simply changing the thickness 102 of the walls which define the pattern. This is by analogy like changing a spring constant by changing the thickness of the wire which forms a coil spring.

Figure 11:
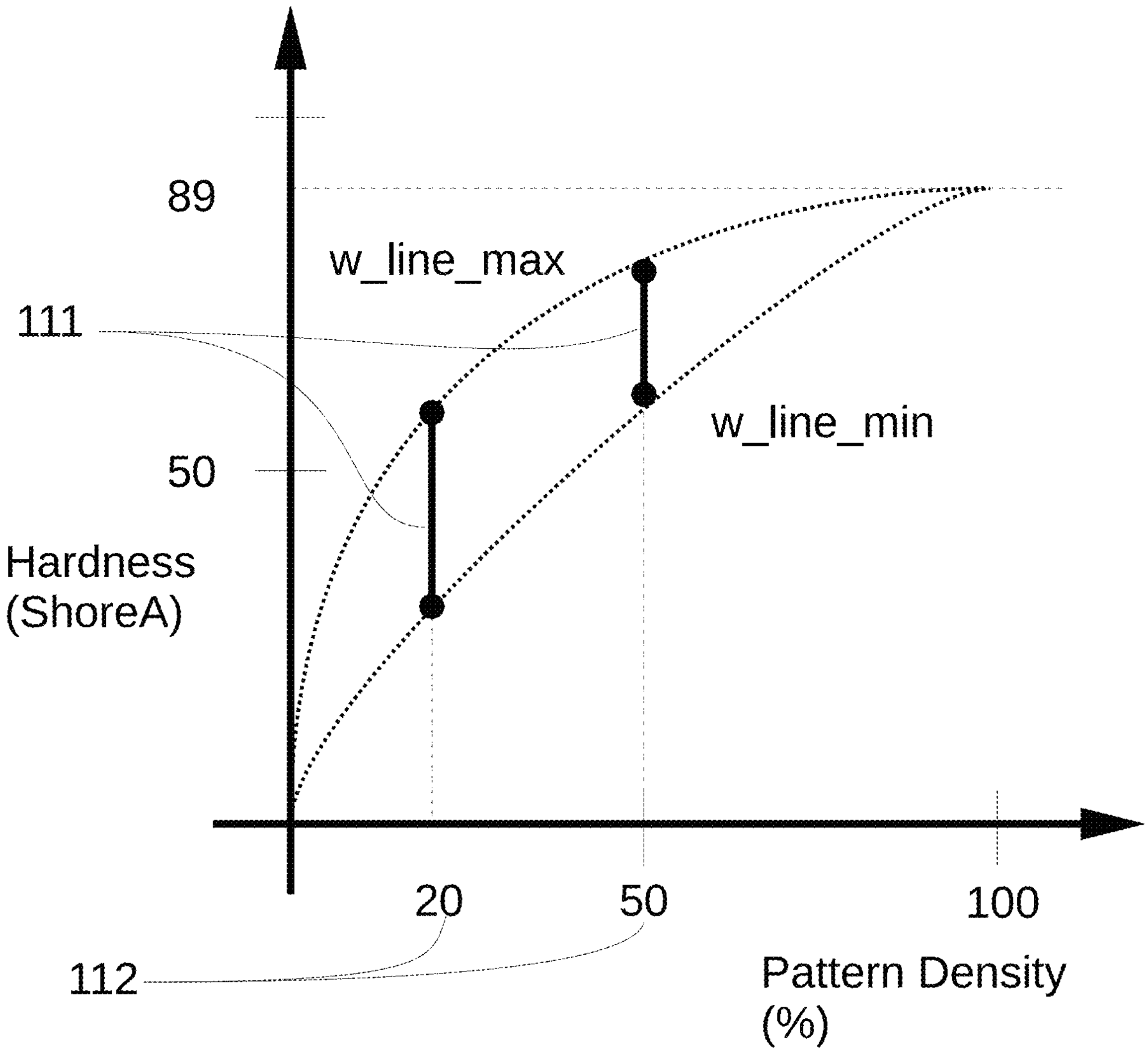
FIG. 11 illustrates a method for choosing the pattern density for a given hardness range.

FIG. 11 illustrates the allowed range of hardness 111 for different densities 112 when using this method in conjunction with flexible TPU based filament.

Figure 12:
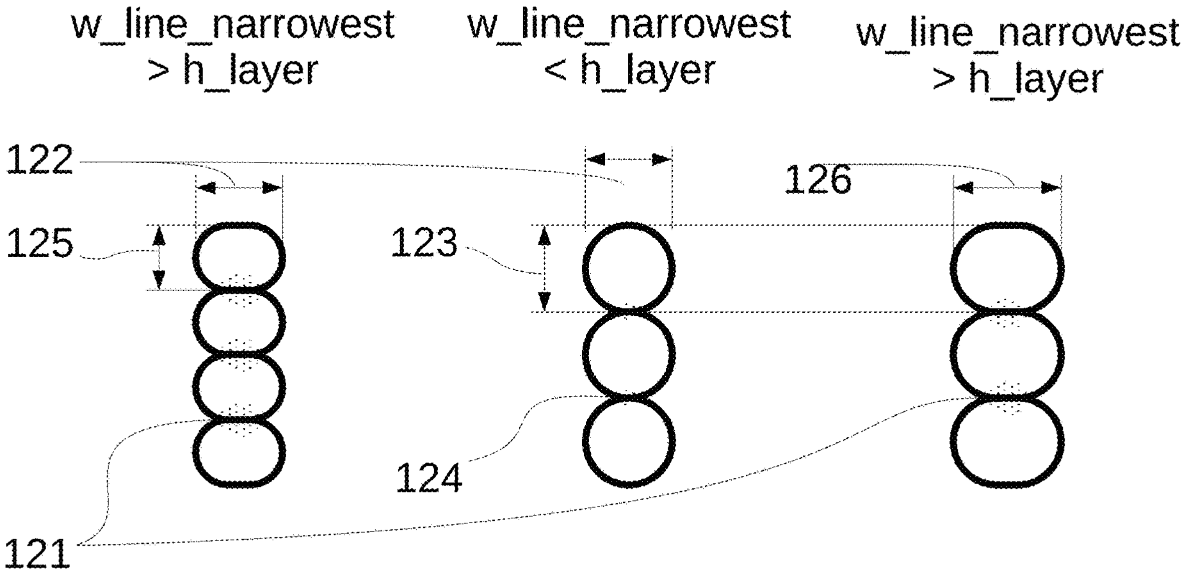
FIG. 12 illustrates some problems encountered when using a wide range of line width and layer heights.

FIG. 12 illustrates a third potential issue that one might encounter during the implementation.

When introducing large variations in the line width one must be aware of the limitations posed by layer based additive manufacturing technologies.

To ensure good adhesion 121 between consecutive layers certain limits must be applied to the ratio between the width of the narrowest line 122 on a layer and the height of the layer 123. This ratio will be different for each material and machine but as a starting point one should aim for the ration to be above 1 at all time:

$$w\_line\_narrowest > h\_layer$$

Where w_line_narrowest is the width of the narrowest line on a layer (mm)

h_layer is the desired height of the layer (mm)

When this ratio gets too low the consecutive layers do not bind to each other 124 and the print is likely considered a failure.

There are two methods to ensure this ratio is met:

In one method, where the accuracy of the achieved engineering property is more important than total print time, the width of the narrowest line is kept 122 and the layer height is reduced on all layers where this line is encountered 125.

In another method where the accuracy of the accuracy of the achieved property is less important than print time, the line height is kept the same 124 and width of the line is increased as such as to provide sufficient bonding 126.

Figure 13:
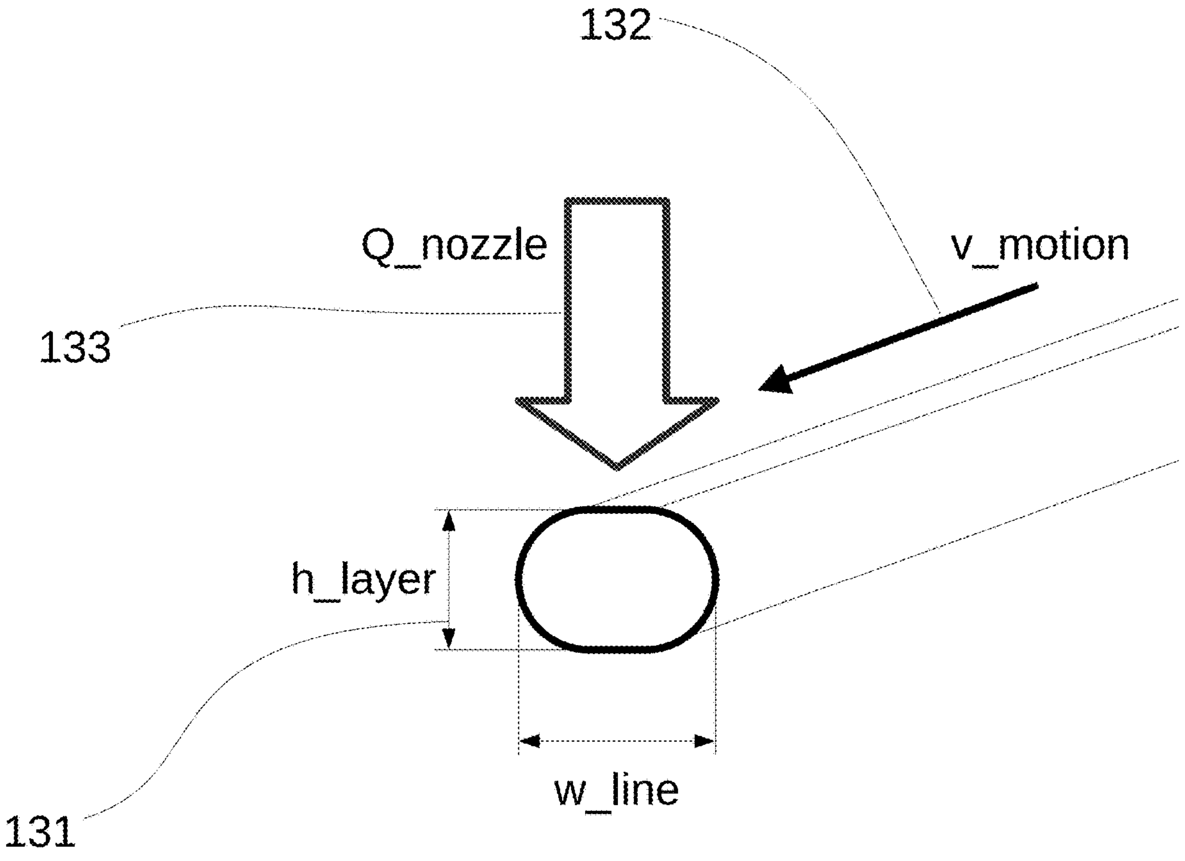
FIG. 13 illustrates the required parameters for calculating the layer height or line width limit for high throughput situations.

FIG. 13 illustrates a fourth potential issue that one might encounter during the implementation.

Where the fast production time requires tall layer 131 and/or fast motion 132, the extruder's ability to melt material on time 133 becomes the limiting factor.

In these cases, the maximum width of the line has to be limited as such:

$$w\_line = Q\_nozzle/(v\_motion * h\_layer)$$

Where w_line is the desired line width (in mm)

Q_nozzle is the maximum throughput of the extruder (mm^3/s)

v_motion is the desired movement speed (mm/s)

h_layer is the desired layer height (mm)

Or if a desired width must be achieved a layer height must be chosen as such as to satisfy the equitation.

$$h\_layer = Q\_nozzle/(v\_motion * w\_line)$$

Where w_line is the desired line width (in mm)

Q_nozzle is the maximum throughput of the extruder (mm^3/s)

v_motion is the desired movement speed (mm/s)

h_layer is the desired layer height (mm)

Figure 14:
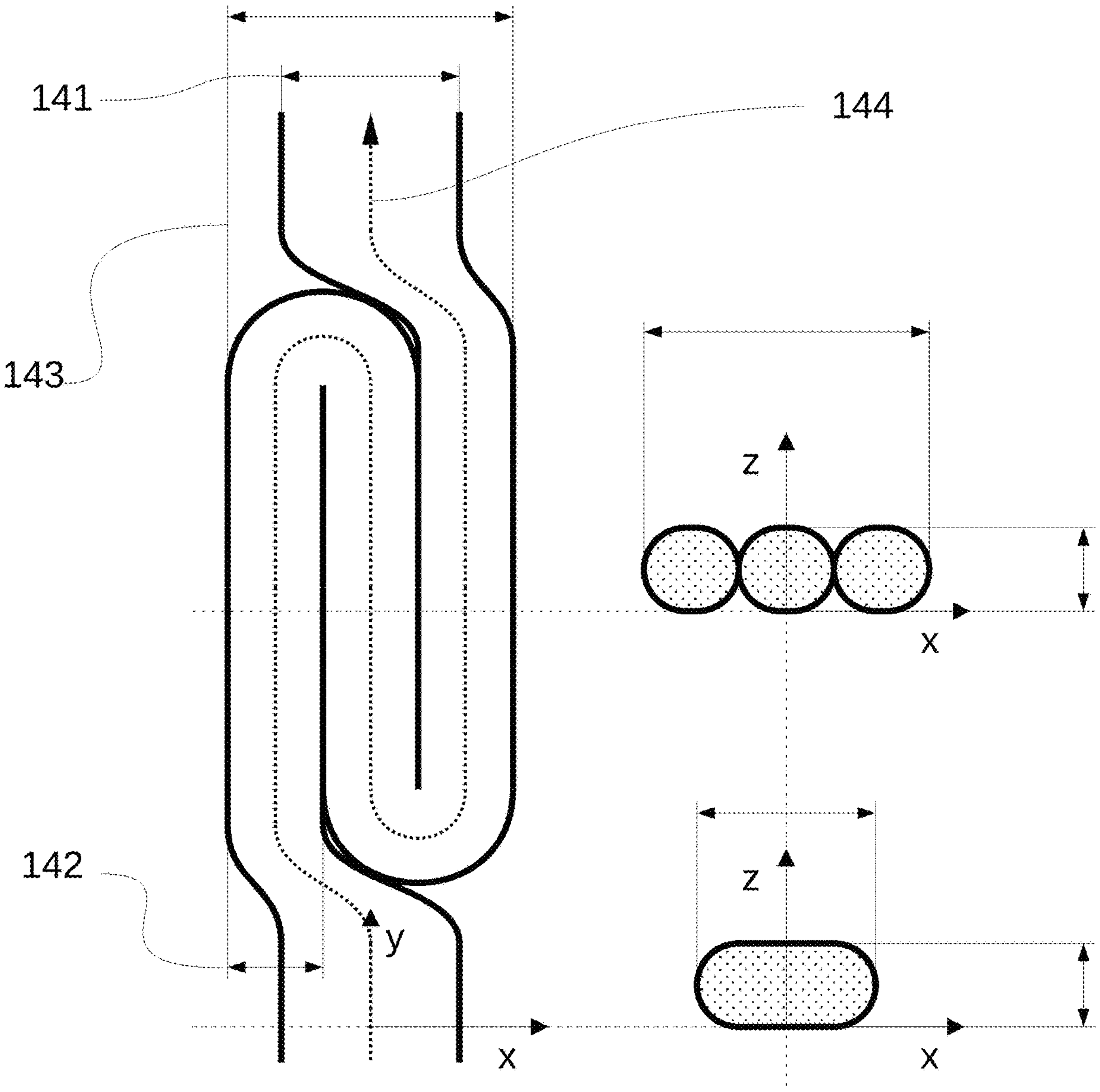
FIG. 14 illustrates a technique that can be used to enhance the achievable line width.

When the maximum achievable width 141 with a single line is not sufficient to fulfil the requirements, it is possible to create a section where multiple smaller lines are used in conjunction to create a region with a wider line width. This is illustrated in FIG. 14.

First the line width is reduced to a fraction of the desired overall width 142 using the techniques outlined above, e.g. by increasing the speed of the relative movement between the stage and the extruder. Subsequently, a new path is generated to create a multiple pass section with line segments extending in opposite, back and forth directions. This multiple pass section has an overall width that is the same as the desired line width 143.

An uneven number of passes allows the line to continue 144 while an even number of passes allows for termination of the line.

This allows for an arbitrary amount of lines to be combined to achieve line width that would normally not be possible with a single pass.

Figure 15:
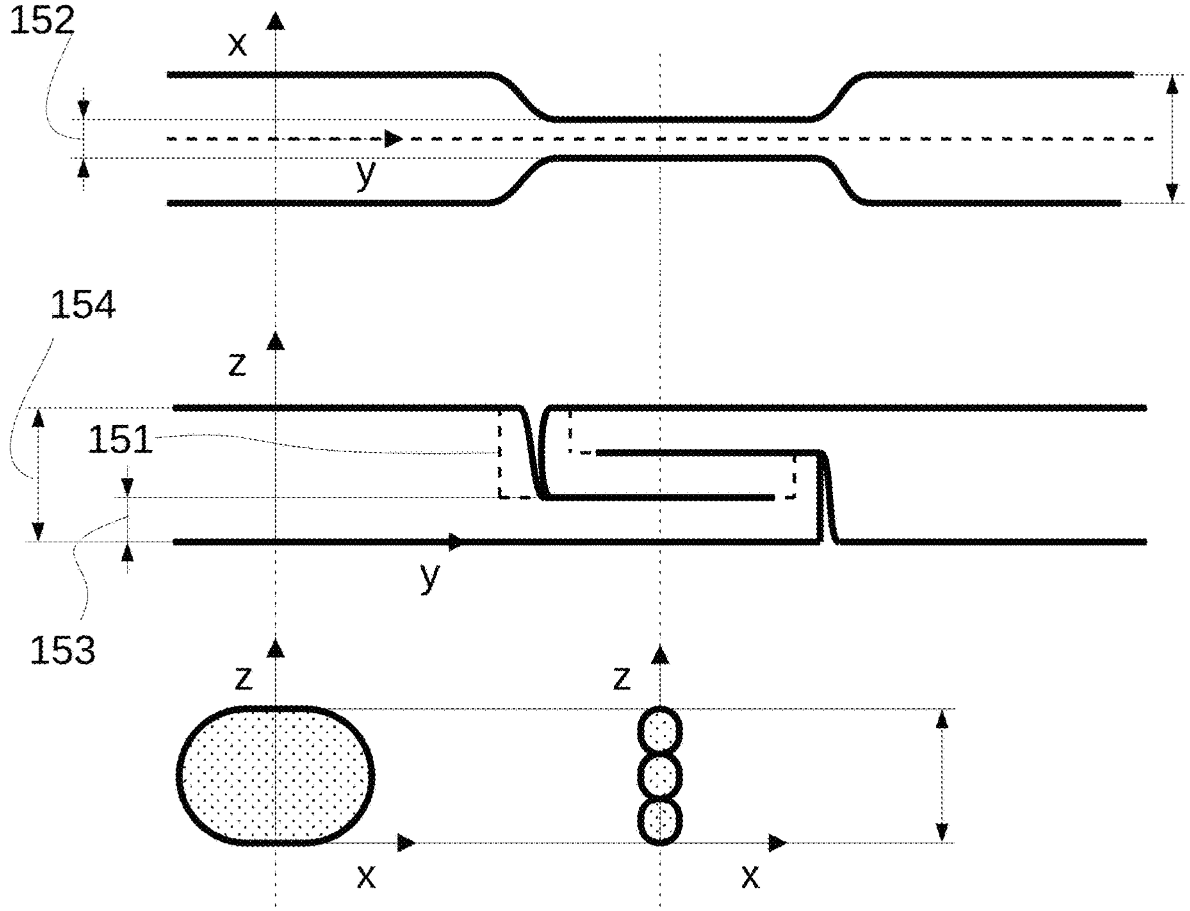
FIG. 15 illustrates a technique that allows for regions with lines narrower than what would normally be possible, without compromising print time.

To ensure good inter-layer bonding, when printing narrow lines, the layer height could be reduced for the whole layer. It is however possible to achieve a similar effect using a multiple pass strategy where the lines are stacked vertically. FIG. 15 illustrates this.

First the tool is moved closer to the stage 151 so that the ratio between the desired line width 152 and the new effective layer height 153 becomes under the desired ratio for good bonding. Simultaneously the relative deposition rate is reduced using the techniques outlined above, e.g. by speeding up the relative movement between the stage and the extruder. The overall amount of deposited material thereby matches the new line width and layer height. Subsequently, multiple passes can be made to stack layers until the overall layer height matches that of the slice 154.

As in the previous case, an uneven number of passes allows the line to continue while an even number of passes allows for termination of the line.

In addition to increasing the available line width, the mentioned techniques can also be used to amend engineering properties.

The previously outlined techniques may be used to create regions with multiple passes where the overall width is not changed. This can for example be done to change the grain of the deposited material to optimize warping behaviour of the region.

Figure 16:
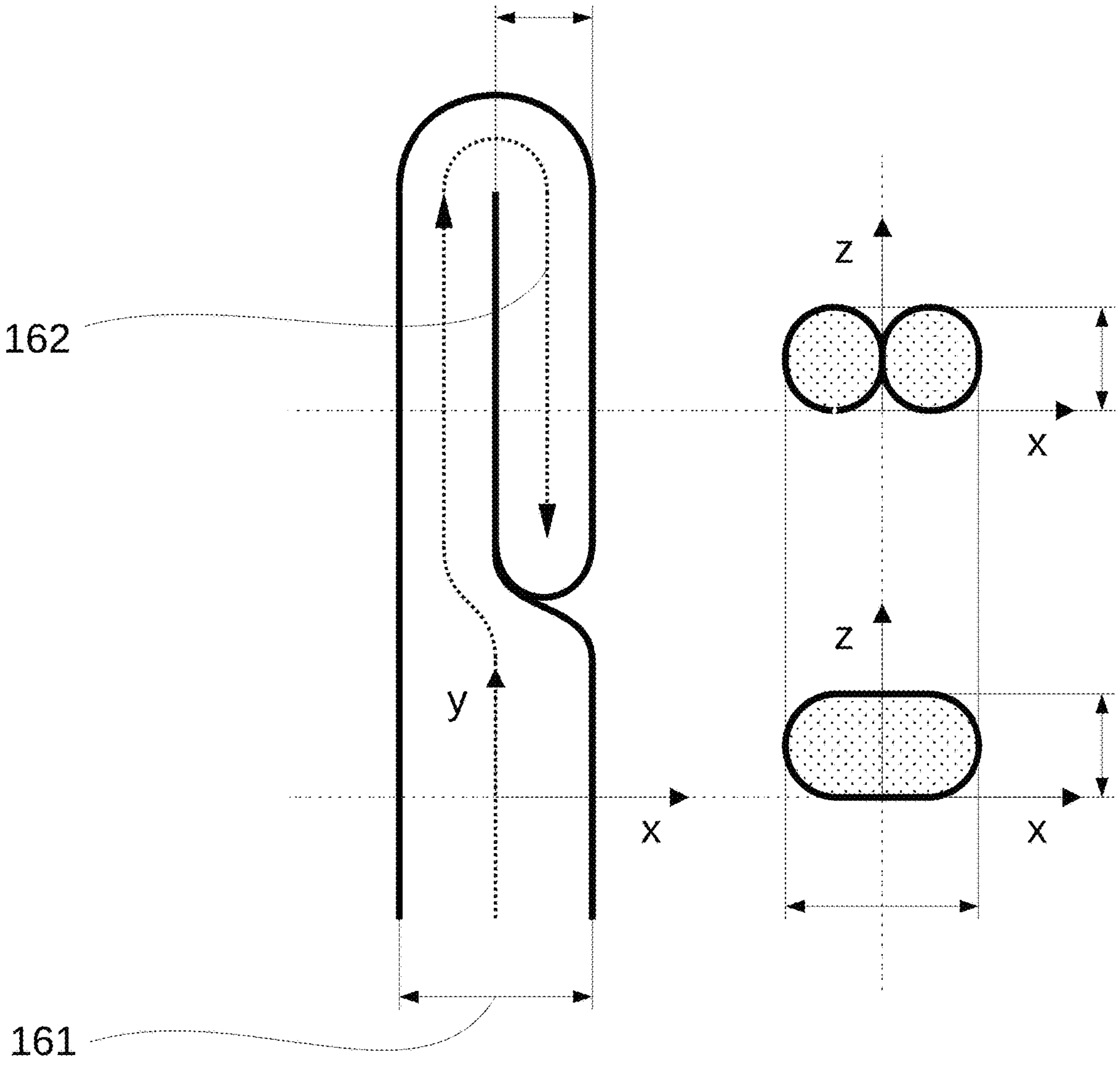
FIG. 16 illustrates the technique illustrated in FIG. 14. being used to optimize for warping behaviour.

FIG. 16 shows how this can be implemented as multiple horizontally stacked passes.

Figure 17:
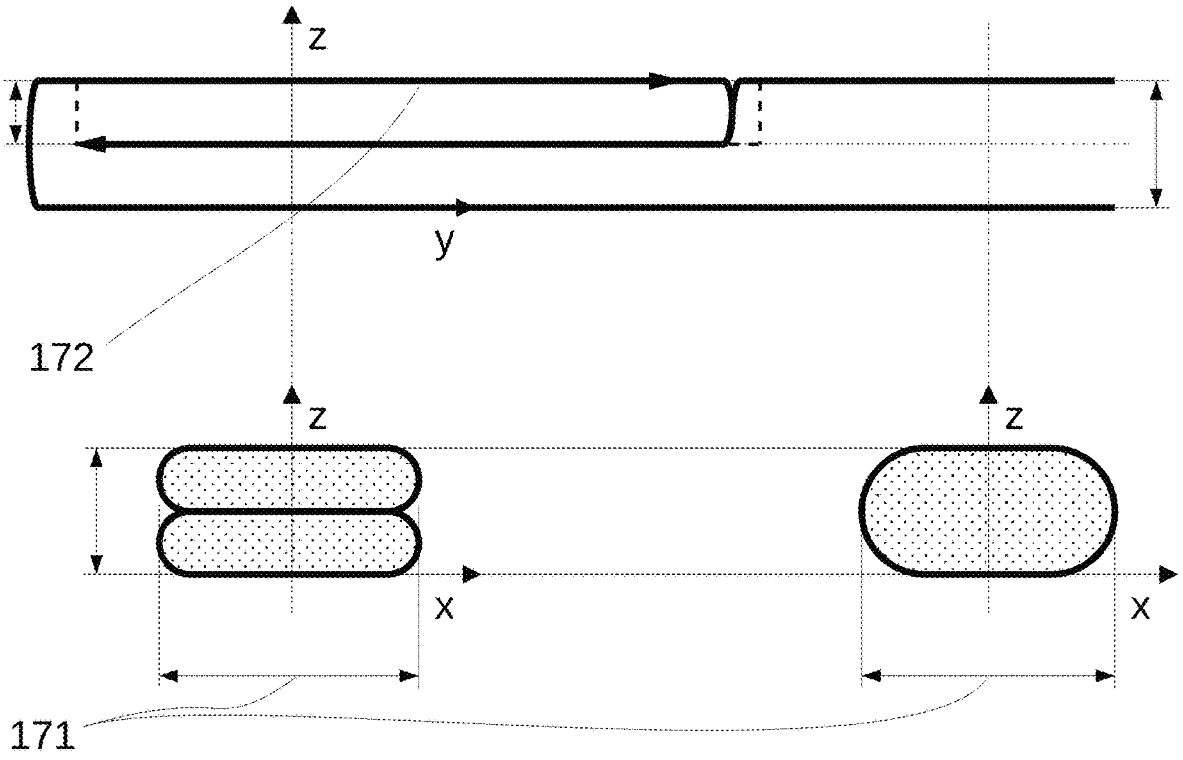
FIG. 17 illustrates the technique illustrated in FIG. 15. used to optimize for warping behaviour.
Figure 18A:
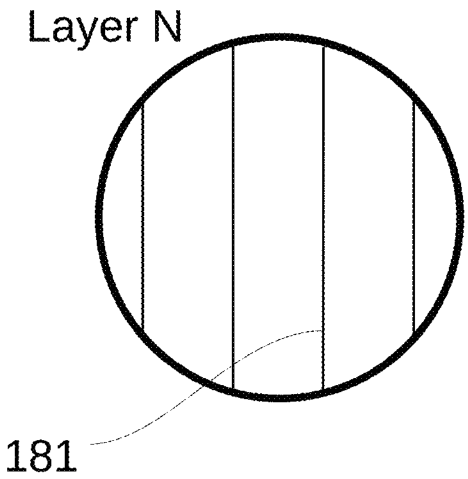
Figure 18B:
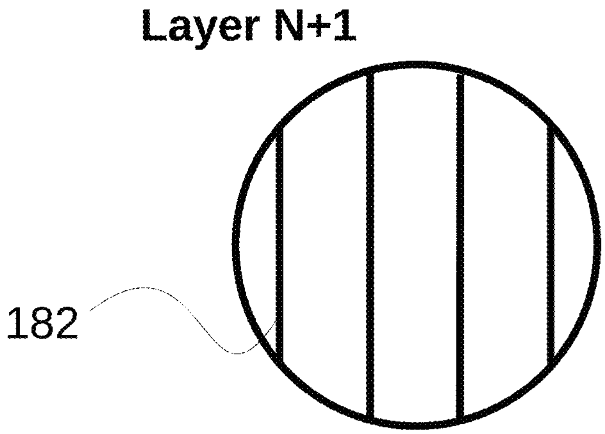
Figure 18C:
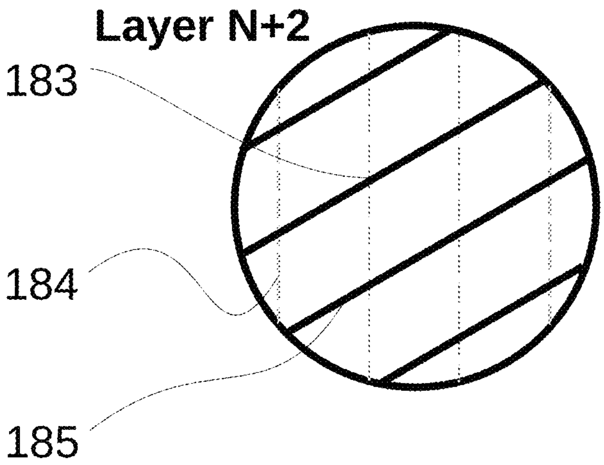
Figure 18D:
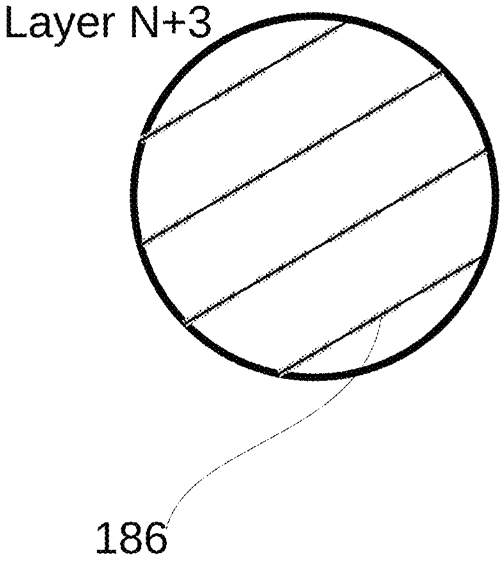

FIG. 17 illustrates how this can be implemented as multiple vertically stacked passes.

In these cases, the goal is not to affect the overall line width 161, 171 rather to modulate the direction of travel during deposition 162, 172. This is done to even out the effects the travel direction during deposition may have on the inner structure and behaviour of the deposited material.

FIG. 18 relates specifically to object strength. A problem arise when the infill pattern between layers has a low contact. In some cases the contact is only a points-contact 183 where lines cross giving an approximate surface contact of $$a\_contact = w\_line * w\_line$$

where w_line is the width of the line (mm)

a_contact is the contact area between layers (mm^2)

The strength of the geometry is low at such regions. To increase the surface contact and strength in such regions, the line width can be increased. It may be at the crossing point or during entire lines with many point-contacts. FIG. 18 illustrates four adjacent layers in which layer N+1 18b and N+2 18c have only point-contacts. In these layers all the lines have their width increased 182, 185.

FIG. 19 relates to a delay in the mechanical system. In extrusion technology, a line is deposited as the nozzle move in the plane. This creates a line printing direction influencing the location of the transition when changing the cross-section of the line in the transition.

FIGS. 19*a* and 19*b* illustrate an object with an inner circle illustrated by a dotted line. Within this circle, a softer engineering property is desired. For this reason, the inner structure is defined with lines extending continuously in the transition, i.e. across the dotted circle, from the portion outside the dotted circle into the portion inside the dotted circle.

In FIG. 19*a*, the inherent gradient transition is illustrated by the portion 192 of one of the continuous lines. This portion is thicker than desired and represents the delay caused by the mechanical system, i.e. when reaching the dotted circle, the controller reduces the line thickness, but the change occurs with a gradient resulting in a thick line extending into the portion inside the dotted circle. This portion 192 is referred to as the error caused by the delay.

Since the inner structure is defined by lines deposited in different directions, i.e. in this example by lines applied in opposite directions as indicated by the arrows, then the gradient results in a distorted transition where the error caused by the delay is alternately from right and from left.

In FIG. 19*b*, the controller is configured to counteract for the delay in the extrusion of material or relative movement between the extruder and the stage. In other words, the controller compensates for the delay by shifting between the start of the deceleration to align the inherent gradient such that the change of the cross-sectional shape of each line in the transition is initiated at different locations relative to the transition to thereby obtain a homogeneous cross-sectional shape of lines deposited in the transition. In this case, the error 194 caused by the delay, is consistently inside the dotted circle and the shape of the lines along the transition, i.e. along the dotted circle, is homogeneous. Another approach could have been to consistently place the error 194 caused by the delay, outside the dotted circle.

The invention claimed is:

1. A printer for printing a 3D object based on a computer model, the printer comprising:

a stage defining a slicing plane, an extruder configured to extrude material, and a controller configured to define the 3D object with an outer contour determined by the computer model and with an inner structure defined by a pattern of lines extending in a lengthwise direction, wherein the controller is configured to control relative movement between the extruder and the stage in an X-direction, a Y-direction, and a Z-direction, the Zdirection being perpendicular to the slicing plane, the Y-direction being perpendicular to the Z-direction, and the X-direction being perpendicular to the Z-direction and being perpendicular to the Y-direction, to thereby create the defined pattern of lines, the lines having a cross-sectional shape defining a line width perpendicular to the Z-direction and a line height in the Z-direction, wherein the controller is configured:

to read a user input defining at least two portions of the 3D object and a desired engineering property of each of the at least two portions, to define the lines of the inner structure such that they extend continuously across a transition from one of the at least two portions into another of the at least two portions, and to change the cross-sectional shape of each line in the transition in accordance with the desired engineering properties wherein the controller is configured to change a path of the line in the transition, wherein the path is changed from a single-pass section in which the line contains only one segment extending in one direction, to a multiple-pass section in which the line contains multiple segments extending back and forth in opposite directions, and wherein the controller is configured to create the multiple-pass section with an uneven number of segments, and to create the multiple-pass section between two single-pass sections to create a continued line structure, of wherein the controller is configured to create the multiple-pass section with an even number of segments, and where the multiple-pass section terminates the line structure.

2. The printer according to claim 1, wherein the controller is configured to define slices of the 3D object, where each slice is defined with a 2D outer slice contour determined by the computer model and an inner 2D slice structure defined by the pattern of the lines, and wherein the controller is configured to control the relative movement between the extruder and the stage to create the defined pattern of lines in layers corresponding to the slices.

3. The printer according to claim 2, wherein the controller has data defining a maximum extrusion rate, and wherein the controller is configured to define a height of at least a portion of at least one of the slices of the 3D object based on the maximum extrusion rate and the cross-sectional shapes of each line in the at least two portions having different engineering property.

4. The printer according to claim 2, wherein the controller has data defining a minimum bonding area between lines in one layer and lines in an adjacent layer, and wherein the controller is configured to define a height of at least a portion of at least one of the slices of the 3D object based on the minimum bonding area and the cross-sectional shapes of each line in the at least two portions having different engineering property.

5. The printer according to claim 1, wherein the controller is configured:

to select between a plurality of patterns each being defined by a predefined range of obtainable engineering properties, and to define the inner structure with at least one pattern selected based on the desired engineering properties.

6. The printer according to claim 5, wherein the controller is configured to change the line width within a predefined line width range, and wherein each pattern is defined within the line width range.

7. The printer according to claim 5, wherein the controller is configured to define the inner structure with the same pattern for all the at least two portions of the 3D object.

8. The printer according to claim 5, wherein the controller is configured to define the inner structure with different patterns for the at least two portions of the 3D object.

9. The printer according to claim 5, wherein the patterns are 2D patterns forming the 3D object in layers.

10. The printer according to claim 1, wherein the controller is configured:

to select between a plurality of materials to be extruded by the extruder, each material being defined by a range of obtainable engineering properties, and to define the inner structure with a material selected based on the desired engineering properties.

11. The printer according to claim 10, wherein the controller is configured to change the line width within a predefined line width range, and wherein each material is defined within the line width range.

12. The printer according to claim 1, wherein the controller is configured to create the multiple-pass section and the single-pass section with different dimension in a direction perpendicular to the Z-direction and with the same dimension in the Z-direction.

13. The printer according to claim 1, wherein the controller is configured to create the multiple-pass section with a smaller dimension perpendicular to the Z-direction than the single-pass section.

14. The printer according to claim 1, wherein the controller is configured to change the cross-sectional shape of each line in the transition to create a multiple-pass section adjacent to a single-pass section, the multiple-pass section and the single-pass section having identical overall cross-section.

15. The printer according to claim 1, wherein the controller is configured to arrange the line segments of the multiple-pass section in a horizontal row of line segments.

16. The printer according to claim 1, wherein the controller is configured to arrange the line segments of the multiple-pass section in a vertical row of line segments.

17. The printer according to claim 1, wherein the controller is configured to define the lines of the inner structure such that they extend as continuous straight lines across the transition.

18. The printer according to claim 17, wherein the controller is configured to define the lines of the inner structure such that they extend as straight or sinusoidal lines between walls forming the outer contour of the 3D object.

19. The printer according to claim 1, wherein the controller is configured to define the lines of the inner structure such that they extend as continuous sinusoidal lines across the transition.

20. A method of controlling a 3D printer for printing a 3D object based on a computer model, the printer comprising:

a stage defining a slicing plane, an extruder configured to extrude material, and a controller configured to define the 3D object with an outer contour determined by the computer model and with an inner structure defined by a pattern of lines extending in a lengthwise direction and having a cross-sectional shape and a line width, wherein the controller is configured to control relative movement between the extruder and the stage in an X-direction, a Y-direction, and a Z-direction, the Z-direction being perpendicular to the slicing plane, the Y-direction being perpendicular to the Z-direction, and the X-direction being perpendicular to the Z-direction and being perpendicular to the Y-direction, and wherein the line width is a dimension perpendicular to the lengthwise direction of the line and perpendicular to the Z-direction, the method comprising:

defining at least two portions of the 3D object and a desired engineering property of each of the at least two portions, define an inner structure with lines extending continuously in a transition from one of the at least two portions into another of the at least two portions, and defining a change of the cross-section in the transition, wherein the change of cross-section is defined in accordance with the desired engineering properties, and controlling the printer to extrude material and control relative movement between the extruder and the stage to form the 3D object, wherein the controller is configured to change a path of the line in the transition, and changing the path from a single pass section in which the line contains only one segment extending in one direction, to a multiple-pass section in which the line contains multiple segments extending back and forth in opposite directions, and wherein the controller is configured to create the multiple-pass section with an uneven number of segments, and to create the multiple-pass section between two single-pass sections to create a continued line structure, or wherein the controller is configured to create the multiple-pass section with an even number of segments, and where the multiple-pass section terminates the line structure.

* * * * *